(12) United States Patent
Sundaresan et al.

(10) Patent No.: US 6,868,400 B1
(45) Date of Patent: Mar. 15, 2005

(54) SPREAD-MAXIMIZING TRAVEL-SERVICES TRADING SYSTEM USING BUYER- AND SELLER-SPECIFIED MULTI-ATTRIBUTE VALUES

(75) Inventors: Neelakantan Sundaresan, San Jose, CA (US); Ankur Datta Sharma, Sunnyvale, CA (US); Ravi V. Condamoor, Sunnyvale, CA (US)

(73) Assignee: NehaNet Corp., San Jose, CA (US)

( * ) Notice: Subject to any disclaimer, the term of this patent is extended or adjusted under 35 U.S.C. 154(b) by 991 days.

(21) Appl. No.: 09/610,903

(22) Filed: Jul. 6, 2000

Related U.S. Application Data

(63) Continuation-in-part of application No. 09/578,192, filed on May 24, 2000, and a continuation-in-part of application No. 09/578,174, filed on May 24, 2000.

(51) Int. Cl.[7] .............................................. G06F 17/60
(52) U.S. Cl. ........................................................ 705/37
(58) Field of Search ............................. 705/26, 35, 37, 705/80, 27, 14

(56) References Cited

U.S. PATENT DOCUMENTS

| | | | | |
|---|---|---|---|---|
| 4,845,625 A | | 7/1989 | Stannard ..................... | 364/407 |
| 5,021,943 A | * | 6/1991 | Grimes ........................ | 709/228 |
| 5,127,104 A | * | 6/1992 | Dennis ........................ | 712/201 |
| 5,414,621 A | * | 5/1995 | Hough ......................... | 705/10 |
| 5,546,564 A | * | 8/1996 | Horie .......................... | 703/1 |
| 5,630,076 A | | 5/1997 | Saulpaugh et al. ......... | 395/284 |
| 5,680,305 A | * | 10/1997 | Apgar, IV .................... | 705/10 |
| 5,717,865 A | * | 2/1998 | Stratmann ................... | 705/10 |
| 5,724,521 A | * | 3/1998 | Dedrick ....................... | 705/26 |
| 5,732,398 A | * | 3/1998 | Tagawa ........................ | 705/5 |
| 5,794,207 A | | 8/1998 | Walker et al. ................ | 705/23 |
| 5,797,127 A | | 8/1998 | Walker et al. ................ | 705/5 |
| 5,845,266 A | | 12/1998 | Lupien et al. ............... | 705/37 |
| 5,873,071 A | | 2/1999 | Ferstenberg et al. ......... | 705/37 |
| 5,897,620 A | | 4/1999 | Walker et al. ................ | 705/5 |
| 5,905,975 A | * | 5/1999 | Ausubel ....................... | 705/37 |

(List continued on next page.)

FOREIGN PATENT DOCUMENTS

EP     0 202 007 A2 * 3/1986

OTHER PUBLICATIONS

Sbase.com markets, technology web pages, Mar. 16, 2000, 5 pages.
Kaplan & Sawhney, "B2B E–Commerce Hubs: Towards a taxonomy of Business Models", 12/99, 10 pgs.
Roddy, "The Evolution of Digital Markets", Tradeum, Inc, Jan. 2000.
Opensite, "The Dynamic Pricing Revolution", 1999.
Bichler, Kaukal, & Segev, "Multi–Attribute auctions for electronic procurement", IAC's Workshop on Internet Based Negotiation Technologies, Mar. 18–19, 1999, pp 1–13.
Tradeum, Inc, "Digital Marketplace Technology", 2/00.

*Primary Examiner*—Vincent Millin
*Assistant Examiner*—Sandra Snapp
(74) *Attorney, Agent, or Firm*—Stuart T. Auvinen

(57) ABSTRACT

A multi-attribute trading system creates value for both the buyer and seller. A spread or net value between the buyer's true value and the seller's true value is divided among the buyer, seller, and trading system. Multiple true values are inputted by a buyer for products with varied attribute specifications such as travel services. These multiple values are stored in a buyer attribute tree. Likewise, the seller specifies multiple true values for a multi-attribute product that are stored in a seller attribute tree. The trading system compares the buyer attribute tree to the seller attribute tree. For each specification of the multiple attributes, the spread or difference between the buyer-specified true value and the seller-specified true value is calculated. The attribute specification producing the maximum of these spreads is selected for trading.

41 Claims, 13 Drawing Sheets

U.S. PATENT DOCUMENTS

| | | | |
|---|---|---|---|
| 5,911,131 A | | 6/1999 | Vig .............................. 705/1 |
| 5,950,177 A | | 9/1999 | Lupien et al. ............... 705/37 |
| 5,960,407 A | * | 9/1999 | Vivona ....................... 705/10 |
| 6,012,051 A | * | 1/2000 | Sammon et al. ............ 706/52 |
| 6,026,384 A | | 2/2000 | Poppen ...................... 705/400 |
| 6,035,288 A | * | 3/2000 | Solomon .................... 705/37 |
| 6,035,289 A | | 3/2000 | Chou et al. ................. 705/37 |
| 6,038,554 A | | 3/2000 | Vig ............................ 705/400 |
| 6,047,274 A | | 4/2000 | Johnson et al. ............ 705/412 |
| 6,055,513 A | * | 4/2000 | Katz et al. .................. 705/26 |
| 6,058,379 A | * | 5/2000 | Odom et al. ................ 705/37 |
| 6,125,352 A | * | 9/2000 | Franklin et al. ............ 705/26 |
| 6,131,087 A | * | 10/2000 | Luke et al. ................. 705/26 |
| 6,141,653 A | * | 10/2000 | Conklin et al. ............ 705/80 |
| 6,154,731 A | * | 11/2000 | Monks et al. .............. 705/35 |
| 6,154,738 A | * | 11/2000 | Call ............................ 707/4 |
| 6,157,918 A | * | 12/2000 | Shepherd ................... 705/37 |

* cited by examiner

Welcome to the Travel Center

INSTRUCTIONS:

Please select your preferences below. These preferences will help us to select a better deal for you. You can change and refine these later.

1. PREFERENCES FOR OUTBOUND DATES:

I [DISLIKE ▼] departing one day BEFORE my specified date.

I [DON'T MIND ▼] departing one day AFTER my specified date.

2. PREFERENCES FOR RETURN DATES:

I [DON'T MIND ▼] returning one day BEFORE my specified date.

I [DISLIKE ▼] returning one day AFTER my specified date.

3. PREFERENCES FOR TIME OF DAY:

I [DISLIKE ▼] taking a flight in the MORNING.

I [STRONGLY PREFER ▼] taking a flight in the AFTERNOON.

I [DON'T MIND ▼] taking a flight in the EVENING.

I [STRONGLY DISLIKE ▼] taking a flight in the NIGHT.

4. PREFERENCES IN RENTAL CAR TYPE:

I [DISLIKE ▼] renting a PREMIUM class car.

I [PREFER ▼] renting a COMPACT class car.

I [DON'T MIND ▼] renting a ECONOMY class car.

5. PREFERENCES IN HOTEL LOCATION:

I [DON'T MIND ▼] staying in a hotel more than 10 miles from the airport.

[SUBMIT]

FIG. 7

Welcome to the Travel Center

ENTER THE DESIRED ATTRIBUTES FOR AIR TRAVEL:

INSTRUCTIONS:
Please select your preferences below. These preferences will help us to select a better deal for you. You can change and refine these later.

1. What is your departure & Destinaton?  [Chicago-NYC ▼]
2. Departure Date & Time?  [Jun ▼] [6 ▼] [3 PM ▼]
3. Return Date & Time?  [Jun ▼] [21 ▼] [7 PM ▼]
4. How much do you want to pay for this ticket?  $ [300]

5. Felxibility in Outbound & Return dates:

a. How much less do you want to pay for DEPARTING one day PRIOR to your specified date?  $ [20]

one day AFTER to your specified date?  $ [30]

b. How much less do you want to pay for RETURNING one day PRIOR to your specified date?  $ [30]

one day AFTER to your specified date?  $ [50]

6. Felxibility in TIME of day:

How much more or less do you want to pay for a flight:

in the MORNING?  $ [-50]

in the AFTERNOON?  $ [0]

in the EVENING?  $ [-30]

in the NIGHT?  $ [-100]

Welcome to the Travel Center

ENTER THE DESIRED ATTRIBUTES FOR HOTEL:

1. Hotel Location ?  [NYC ▼]
2. Check-in Date ?  [Jun ▼] [6 ▼]
3. Check-out Date ?  [Jun ▼] [21 ▼]
4. What is the daily rate you want to pay ?  $ [150]

5. Felxibility in Check-in & Check-out dates:

a. How much less do you want to pay for Checking-in
       one day PRIOR to your specified date ?  $ [10]
       one day AFTER to your specified date ?  $ [20]
   b. How much less do you want to pay for checking-out
       one day PRIOR to your specified date ?  $ [20]
       one day AFTER to your specified date ?  $ [10]

6. Felxibility in Proximity to the airport:
   How much more or less do you want to pay for a Hotel within 10 miles of the airport ?  $ [0]

7. Any Hotel Chains to exclude ?  
   [NONE ▼]
   [CLARION]
   [MOTEL6]

Welcome to the Travel Center

ENTER THE DESIRED ATTRIBUTES FOR RENTAL CAR:

1. Pick-up & Drop-off Location ?   [NYC-JFK ▼]
2. Pick-up Date & Time ?   [Jun ▼] [6 ▼] [4 PM ▼]
3. Drop-off Date & Time ?   [Jun ▼] [21 ▼] [5 PM ▼]
4. What is the daily rate you want to pay ?   $ [53]
5. Car Class ?   [MID-SIZE ▼]
6. Felxibility in Pick-up & Drop-off dates:
    a. How much less do you want to pay for picking up
        one day PRIOR to your specified date ?   $ [10]
        one day AFTER to your specified date ?   $ [0]
    b. How much less do you want to pay for dropping off
        one day PRIOR to your specified date ?   $ [0]
        one day AFTER to your specified date ?   $ [10]
7. Felxibility in car class:
    How much more or less do you want to pay for a car of the
        PREMIUM class ?   $ [+20]
        COMPACT class ?   $ [-10]
        ECONOMY class ?   $ [-20]
8. Any Rental-Car Chains to exclude ?   [NONE ▼]
                                        [AVIS]
                                        [ACE]

Welcome to the Travel Center

WE FOUND A DEAL FOR YOU !

Here are the details:

| Category | Seller | Description | Your Price | Deal Price |
|---|---|---|---|---|
| Air | United | 6/6/00 3 PM<br>6/12/00 1 PM | 300 | 250 |

The total price for this package based on your preferences is $ 300.
We have found a deal for you at $ 250. This nets you a savings of $ 50.

| BUY |

| ADJUST |

Welcome to the Travel Center

WE FOUND A DEAL FOR YOU !

Here are the details:

| Category | Seller | Description |
|---|---|---|
| Air | United | 6/6/00 3 PM   6/12/00 1 PM |
| Hotel | Hyatt | Downtown 5th St. |
| Car | Avis | Mid-Size |

[BUY]

The total price for this package based on your preferences is $ 650.
We have found a deal for you at $ 600. This nets you a savings of $ 50.

| Category | Seller | Description |
|---|---|---|
| Air | Delta | 6/5/00 1 PM   6/12/00 6 PM |
| Hotel | Doubletree | Downtown 12th St. |
| Car | Alamo | Mid-Size |

[BUY]

The total price for this package based on your preferences is $ 660.
We have found a deal for you at $ 620. This nets you a savings of $ 40.

[ADJUST]

Welcome to the Travel Center

WE COULD NOT FIND A DEAL.
THE BEST ALTERNATIVE AT A HIGHER PRICE IS:

Here are the details:

| Category | Seller | Description |
|---|---|---|
| Air | United | 6/6/00 3 PM   6/12/00 1 PM |
| Hotel | Hyatt | Downtown 5th St. |
| Car | Avis | Mid-Size |

[BUY]

The total price for this package based on your preferences is $ 650.
The best we found is at $ 690. This is above your value by $ 40.

[QUEUE]  Click this button to have the system keep looking for a deal that meets your value.

[ADJUST]  Click this button to adjust your values.

SPREAD-MAXIMIZING TRAVEL-SERVICES TRADING SYSTEM USING BUYER- AND SELLER-SPECIFIED MULTI-ATTRIBUTE VALUES

RELATED APPLICATION

This application is a continuation-in-part of the co-pending applications for "Attribute Tree for Modeling Value of Multi-Attribute Products/Services for an Online Trading System", U.S. Ser. No. 09/578,192, filed May 24, 2000, and "Net-Value Creation and Allocation in an Electronic Trading System", U.S. Ser. No. 09/578,174, filed May 24, 2000.

FIELD OF THE INVENTION

This invention relates to electronic commerce systems, and more particularly to a trading system that determines trading prices and product specifications based on spreads between buyer and seller supplied values of travel services with multiple attributes.

BACKGROUND OF THE INVENTION

The rapid acceptance of the Internet has been accompanied by a shift from simple advertising to the actual selling of products. Products can be sold over electronic media without intervention by a human salesperson, reducing sales costs. Large electronic commerce companies such as Amazon.com of Seattle, Wash. have pioneered selling of standard products such as books, videos, and toys to consumers over the Internet.

More complex products such as travel services are also being sold over the Internet by travel sites such as Travelocity, Preview Travel, and Expedia. Travel services differ from simple consumer products such as books in that many attributes of travel must be specified. For example, a buyer must specify days and times of travel, departing and destination airports, class of service, seat locations within the plane, and preferred airline. Often the travel sites will list alternative flights from several airlines, allowing the buyer to select his exact flight. The buyer may then go on to select a hotel and rental car.

The travel services purchased are thus a complex product that can be defined by many attributes—flight day, time, airline, seat, hotel, rental car. Travel sites use special software to guide buyers to select from among the many alternative attributes of travel services offered by many travel-service providers.

The prices for the travel services purchased from the travel sites are fixed by the sellers. While the buyer can adjust attributes to change the purchase price, the price for a travel service with a particular set of attributes is pre-set by the travel providers (sellers). Thus the travel sites, while selling complex, multi-attribute products, have a built-in bias that favors the seller.

Some travel-auction sites allow buyers to specify the price they are willing to pay for a travel service. Forward-auction travel sites, such as SkyAuction.com and Egghead.com (formerly OnSale.com), specify exact products and allow users to bid against each other for the travel specified by the travel site. Thus the seller specifies the attributes of travel, while the users specify the price. Some auctions may allow the winning bidder to select travel dates from among a range of dates, but the attributes that the buyer can specify are much more limited than on the standard travel sites.

Reverse auctions have been described in a number of patents by Priceline.com, such as U.S. Pat. Nos. 5,794,207, 5,897,620, and 5,797,127 by Walker et al. The Priceline travel service allows a buyer to specify travel dates and price, while the sellers specify other attributes such as travel time, seat location, and connecting flights. The service may suggest prices and urge the buyer to raise his price to better match desired seller prices that are otherwise hidden from the buyer. The buyer is not able to specify attributes that may be critical to him, such as travel times or non-stop flights. The Priceline system is thus biased toward the buyer in price, but biased toward the seller in attribute selection. Travel attributes are not selected based on the value that the buyer places on those attributes.

Other electronic trading exchanges have emerged for a variety of products ranging from commodities and air cargo to energy. These are typically single-attribute trading systems. For example, U.S. Pat. No. 5,845,266 by Lupien et al., and assigned to Optimark Technologies of Durango, Colo., matches buy and sell orders using a satisfaction density profile matrix. However, only one attribute, quantity, is specified in addition to price. See also U.S. Pat. No. 5,873,071 by Ferstenberg et al., and assigned to ITG Inc. of NY, which describes a negotiation-based commodities exchange. Multiple values of multi-attribute products are not specified by buyers and sellers though. Some systems, such as described in U.S. Pat. No. 6,035,289 by Chou et al., and assigned to IBM of Armonk, N.Y., matches buyers and sellers of air cargo based on as many matching attributes as possible. However, buyers and sellers do not specify values. There is no system to maximize values for both the buyer and seller.

Several other patents describe valuation systems, such as U.S. Pat. Nos. 6,026,384, 6,038,554, and 5,911,131. While valuation systems can assist buyers or sellers, such valuation systems are not integrated with a trading system. The valuation systems do not maximize value to both the buyer and seller.

What is desired is a trading system that maximizes value to both buyers and sellers. A neutral trading system that is not biased toward the buyer or the seller is desired. A multi-attribute trading system for complex multi-attribute products such as travel services is desired. It is desired to set the trading price based on a spread between values inputted by buyers and sellers. A trading system that maximizes the spread between buyer and seller values is desired. The spread is maximized by selecting from among multiple attributes of the product traded to find a specification of attributes that maximizes a spread or difference between a buyer-specified value and a seller-specified value. An integrated multi-attribute, spread-maximizing trading system is desired.

SUMMARY OF THE INVENTION

A spread-maximizing trading system is for trading multi-attribute products. A plurality of seller trading agents access seller databases containing seller true values for multi-attribute products that are distinguished by a variety of attributes with attribute values. Each seller trading agent represents a seller.

A buyer interface receives buyer true values from a buyer, the buyer interface generates buyer true values for the multi-attribute products distinguished by the variety of attributes with attribute values.

A trading manager is coupled to the buyer interface and to the plurality of seller trading agents. It receives the buyer true values and the seller true values for the multi-attribute products. An attribute manager is coupled to the trading manager. It generates a plurality of spreads for the multi-attribute products. Each spread in the plurality of spreads is a difference of a buyer true value and a seller true value for a specific combination of attribute values.

The trading manager finds a spread-maximizing product in the multi-attribute products by finding a maximum spread in the plurality of spreads generated by the attribute manager. The maximum spread has a largest difference between the buyer true value and the seller true value. The maximum spread occurs for a spread-maximizing combination of the attribute values that specifies the spread-maximizing product.

The trading manager selects the spread-maximizing product for sale by the seller to the buyer. The trading manager notifies the buyer of the spread-maximizing combination of the attribute values that specifies the spread-maximizing product. Thus the spread-maximizing product is selected by finding the spread-maximizing combination of the attribute values having a maximum difference between the buyer true values and the seller true values.

In further aspects of the invention a spread distributor receives the maximum spread. It divides the maximum spread among the buyer and a seller. The spread distributor assigns a buyer portion of the maximum spread to the buyer and a seller portion of the maximum spread to the seller.

The trading manager reports a deal price to the buyer interface. The deal price is the buyer true value for the spread-maximizing combination of the attribute values less the buyer portion of the maximum spread. The buyer pays the deal price, which is less than the buyer true value by the buyer portion of the maximum spread. Thus the buyer pays a price that is lower than the buyer true value, the price being lowered by the buyer portion of the maximum spread.

In still further aspects the seller receives a seller payment that is larger than the seller true value for the spread-maximizing product. The seller payment is larger by the seller portion. Thus the seller receives the seller payment that is larger than the seller true value.

In further aspects the maximum spread includes an exchange portion. The exchange portion is the maximum spread less the buyer portion and the seller portion. The exchange portion is paid to the spread-maximizing trading system. Thus the maximum spread is divided among the buyer, seller, and the spread-maximizing trading system.

BRIEF DESCRIPTION OF THE DRAWINGS

FIG. 7 is a screen shot of a web page for entering default preferences.

FIG. 8 shows a web page for a buyer to enter baseline and delta values for air travel.

FIG. 9 shows a web page for a buyer to enter baseline and delta values for a hotel stay.

FIG. 10 shows a web page for a buyer to enter baseline and delta values for a rental car.

FIG. 11 is a web page displaying attributes for a spread-maximizing deal found by the trading manager.

FIG. 12 is a web page displaying attributes for several spread-maximizing deals found by the trading manager.

FIG. 13 is a web page displaying the best deal at a higher price found by the trading manager.

DETAILED DESCRIPTION

Figure 1:
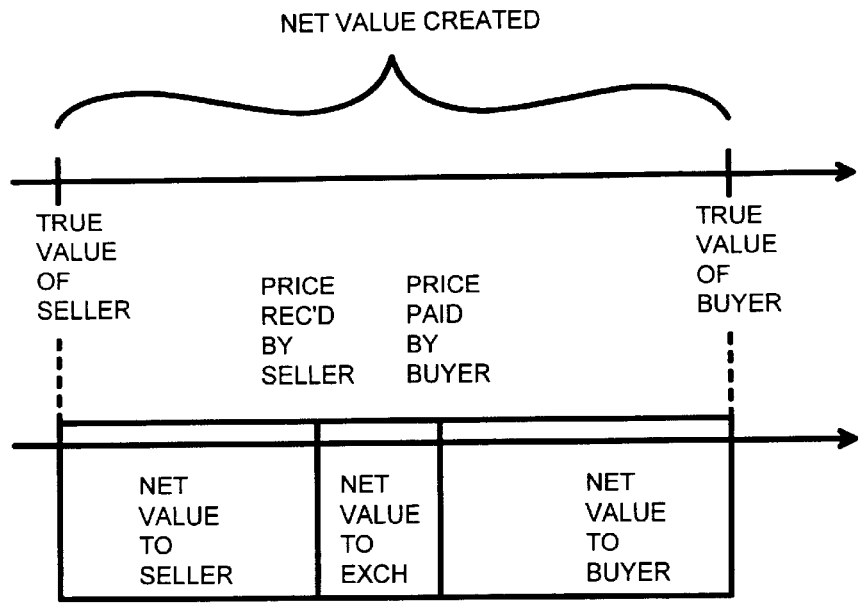
FIG. 1 is a diagram comparing true values placed on a product by the buyer and by the seller in a simplified 2-party trade.

The present invention relates to an improvement in electronic trading systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a fair trading system needs to provide or add value to both buyers and sellers. While it is difficult to create value for simple, single-attribute products, value can be created by the trading system when complex, multi-attribute products are traded.

The inventors have developed a system that stores values placed on multi-attribute products. Multiple values are inputted by a buyer for products with varied attribute specifications. These multiple values for the multi-attribute product are stored in an attribute tree. Likewise, the seller can also specify multiple value for a multi-attribute product. The parent application for "Attribute Tree for Modeling Value of Multi-Attribute Products/Services for an Online Trading System", U.S. Ser. No. 09/578,192, filed May 24, 2000, describes such attribute trees that store multi-attribute product values.

The inventors have also developed a trading system that creates value for both the buyer and seller. A spread or net value between the buyer's true value and the seller's true value is divided among the buyer, seller, and trading system. A second parent application, for "Net-Value Creation and Allocation in an Electronic Trading System", U.S. Ser. No. 09/578,174, filed May 24, 2000, describes such a trading system.

The inventors have further realized that attribute trees can be combined with a spread-based trading system. Attribute trees can be used to store values of multi-attribute products inputted by buyers and sellers. The trading system can then compare the buyer attribute tree to the seller attribute tree. For each specification of the multiple attributes, the spread or difference between the buyer-specified value and the seller-specified value can be calculated by the trading system. The attribute specification producing the maximum of these spreads can then be selected. The product with the attributes producing the maximum spread is then selected for trading. Thus the product attribute-specification selected is the one that maximizes the spread between buyer and seller values.

The spread is thus maximized by selecting from among multiple attributes of the product traded to find a specification of attributes that maximizes a spread or difference between a buyer-specified value and a seller-specified value.

Both the buyer and the seller benefit from the spread-maximizing trading system. Attributes tend to be selected that the buyer most highly values and that the seller least values. These spread-maximizing attribute specifications may not be obvious or easily discerned, especially when many, many attributes can be specified in a complex product. The multi-attribute trading system is ideally suited for travel services since travel products have multiple attributes that affect the price.

Buyer and Seller Express True Values (TV)

Trading partners can be buyers, sellers, or facilitators of a 2-or-more party trade. The trade is for a product or service that may consist of several sub-products or trading elements, such as air, hotel, and rental car for a travel package. Each trading element can be specified by a set of attributes that have certain attribute values. The attribute "time-of-day" for an "air" trading element can take on the attribute value "morning", "afternoon", etc.

The trade is for a product with an attribute-specification of a particular set of attribute values. The attribute-specification is selected from among many possible attribute-specifications for a product by the trading system, not directly by the buyer or seller. The buyer and seller influence the trading system's choice by values they place on different attributes.

The trading partners express their value of a particular product attribute using True Values (TV). True Values vary with attributes specified for the product or trading elements. The True Value may be identified using a baseline value for each trading element and a differential or delta for each of the attribute values for these trading elements.

For instance, a customer may provide a baseline value (price) of $500 for a ticket from San Francisco to New York. The customer may specify a differential or delta of +$40 for a "morning" attribute, indicating that a morning flight is of higher value to the customer. Further, the customer may specify a differential or delta of −$50 for an "evening" attribute, indicating that an evening flight is of less value to the customer.

Alternatively, the TV may be stated as a price at which the trading partner values each valid combination of attribute values describing the trading elements. For instance, the customer may specify the value of a morning flight from San Francisco to New York at $460 and the evening flight at $550.

The trading system keeps True Values of one trading partner confidential from other trading partners. A trading partner may selectively disclose their True Values to selected trading partners to allow for cooperative and coordinated pricing strategies. Trading partners may also selectively adjust their True Values for particular trading partners, such as travel-alliance partners, when participating in the same trade with them.

The true values of each trading partner are stored in an attribute tree for that trading partner and trade. The attribute tree allows many values to be expressed for different attribute-specifications of a product. Attribute trees from the buyer and seller (and other trading partners) can then be compared by the trading system.

Trading System Creates Net Value (NV)

The spread is known as the net value. In a two-party trade, the difference between the true values for the buyer and seller is the spread or net value. In multi-party trades, the net value is the difference between the sum of the true values submitted by all of the buyers and the sum of the true values submitted by all of the sellers in the trade. Each set of attribute values has a different spread or net value.

FIG. 1 is a diagram comparing true values placed on a product by the buyer and by the seller in a simplified 2-party trade. For normal trades the seller specifies true values lower than the buyer's true values for at least some of the attribute combinations. When the buyer values a product less than the seller values a product, no trade is possible.

The difference in the true values of the buyer and seller is the net value (spread) created by the trading system. The trading system computes the spread for each combination of attribute values, and then selects the combination of attribute values (the attribute-specification) that has the maximum spread or net value.

This spread-maximizing net value is then divided among the buyer, seller, and the trading exchange. The buyer buys at a price lower than his true value, while the seller sells at a price above his true value. A third portion of the net value, the difference between the price the buyer pays and the price the seller receives, is kept by the trading system as a commission. Alternatively, the entire net value can be distributed among the buyer and seller, with a separate fee paid to the trading system.

In a multi-party trade, the buyer's TV is replaced with the sum of all the TV's for all the buyers for a particular attribute specification. The seller's TV is likewise replaced with the sum of all the seller's TV's for that same attribute specification. The buyers can have differing TV's, as can the sellers.

Figure 2:
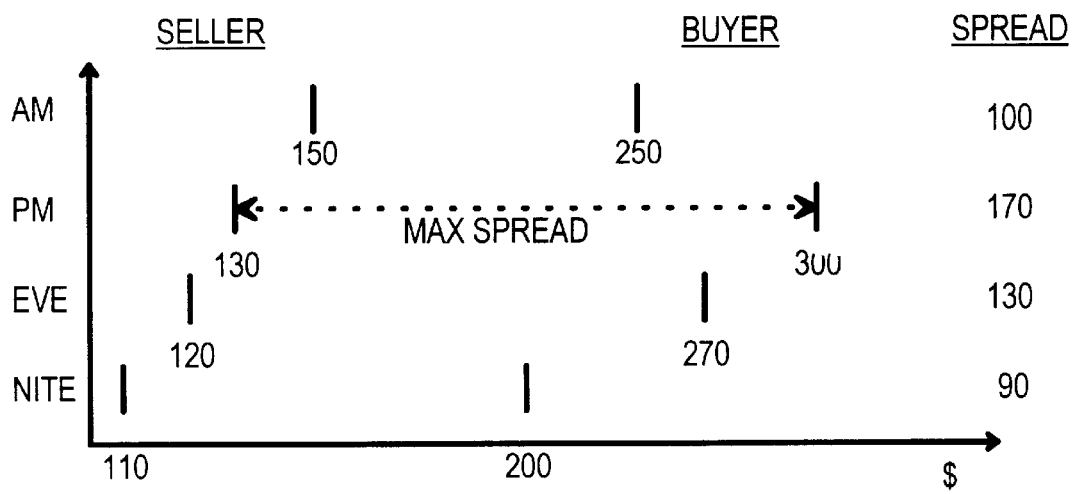
FIG. 2 illustrates a simple multi-attribute trade showing true values of a buyer and of a seller, and selection of a spread-maximizing attribute-specification.

Multi-Attribute Spread-Maximizing Trade—FIG. 2

FIG. 2 illustrates a simple multi-attribute trade showing true values of a buyer and of a seller, and selection of a spread-maximizing attribute-specification. The product being traded is a seat on a plane from Chicago to New York City. While there are many attributes to this product, only one attribute, time-of-day, is shown in this example. In this example, the attribute time-of-day can take on four values: morning, afternoon, evening, night. These attributes are shown on the y-axis, while true values in dollars are shown on the x-axis.

The seller inputs four true values for the four attribute values. For the attribute value "morning", the seller inputs a true value of $150. True values of $130, $120, and $110 are inputted for attribute values of "afternoon", "evening", and "night". The seller thus highly values morning flights, and places decreasing values on later flights in the day, evening, and night. Perhaps the seller can easily fill morning flights with high-paying business travelers, but has many empty seats at night. These seller true values can be inputted as discrete values, or as delta values (+20, 0, −$10, −$20) from a baseline value ($130).

The buyer also inputs true values for the product having the different values of the time-of-day attribute. For the attribute value of "morning", the buyer inputs $250. Afternoon flights are preferred by this buyer, so a higher true value of $300 is entered. Evening flights have a true value to this buyer of $270, while night flights have a true value of only $200, indicating that this buyer is willing to pay $100 more for an afternoon flight than for a night flight.

The trading system receives these true values from the buyer and from the seller, and does not reveal the true values to the trading parties. Instead, the trading system computes the spread, or net value, for each attribute value by subtracting the seller's true value from the buyer's true value for each value of the time-of-day attribute. For the attribute value "morning" the trading system calculates a spread of $250 $150, or $100. The spreads for "afternoon" is larger, $170, while the spread for "evening" and "night" are lower, $130 and $90, respectively.

The trading system compares the calculated spreads ($100, $170, $130, $90) and selects the attribute value ("afternoon") that has the maximum spread, $170. This attribute-specification ("afternoon") has the maximum spread, thus creating the maximum value for both buyer and seller.

The maximum spread ($170) is then divided among the buyer, seller, and trading system. The spread may be split three ways, such as by assigning $60 to the buyer, $60 to the seller, and $50 to the trading system. The buyer pays $60 below his true value for the "afternoon" attribute value, or $240 ($300–$60). The seller receives $60 above his true value for the "afternoon" attribute value, or $190 ($130+$60). The trading system receives the difference between the price the buyer pays and the seller receives, $50 ($240–$190).

The seller is happy since he received $60 more than his true value of $110 for an afternoon flight. The buyer is also satisfied, since he paid $60 less than his true value of $300 for an afternoon flight. The trading system is likewise rewarded for finding the attribute values that most rewarded both the buyer and seller.

In an actual trading system, many more attributes must be considered, such as flight dates, class of service, non-stop vs. connecting flights, and perhaps alternate airports in a city. The buyer may value some airlines more highly than others, and these can be reflected in the buyer's true values. Several different sellers offering similar flights can have their true values compared by the trading system to the buyer's true values, which selects the seller having true values that maximizes the net value. The time-of-day attribute may have a finer resolution, such as hourly intervals, and other trading elements such as rental cars and hotel stays can be combined for the overall trade. The trading system may select the top two or three net values, and display the attribute values for these to the buyer, allowing the buyer to make the final select. Multiple buyers may also be considered.

Figure 3A:
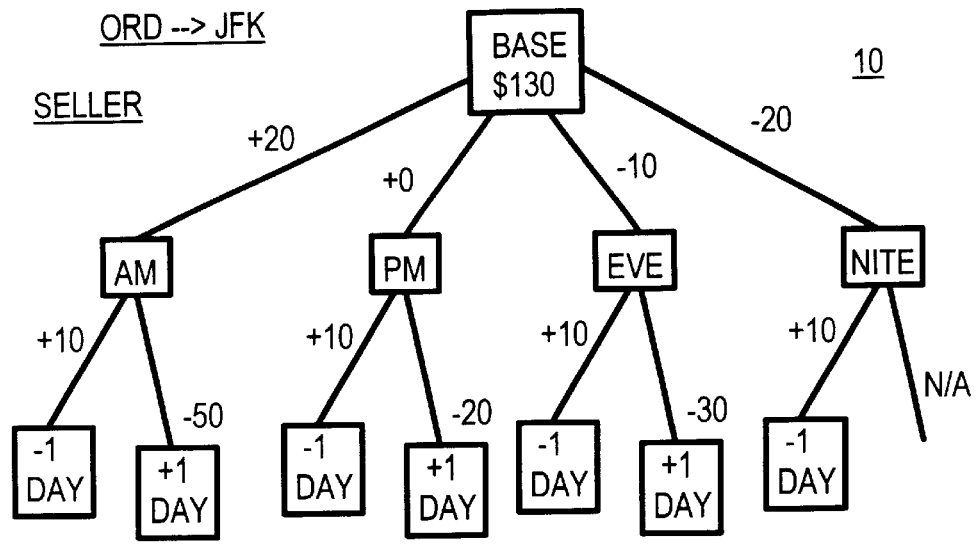
FIGS. 3A, 3B show attribute trees for a seller and for a buyer of an air flight.

Attribute Trees—FIGS. 3A,B

Figure 3B:
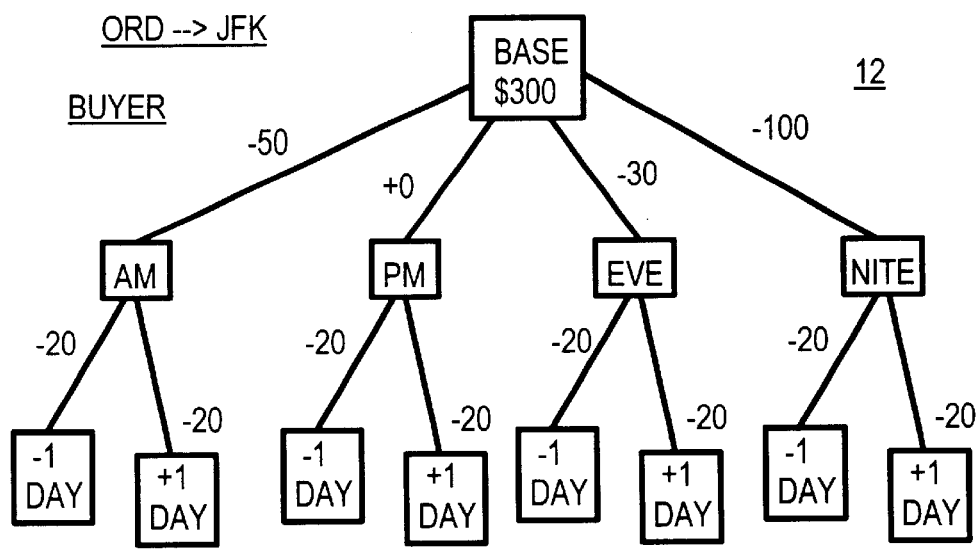

FIGS. 3A, 3B show attribute trees for a seller and for a buyer of an air flight. In FIG. 3A, seller attribute tree 10 stores true values of a flight from Chicago to New York that are inputted by a seller. A base value of $130 is stored at the root of seller attribute tree 10. Four branches from the root show delta values for different values of the time-of-day attribute. For morning ("AM"), a delta value of +20 indicates that the seller values morning flights at $150, $20 above the baseline price of $130. Afternoon flights ("PM") have a delta value of 0, while evening has a delta value of –10 and night has a delta value of –20.

Another attribute is "day". For departure one day earlier, the seller has specified delta values of +10 for all four time-of-day values. These "day" attribute branches are connected to the "time-of-day" branches. Since the "day" branches are the final branches, they are known as endpoints or leaves of the attribute tree. The actual true value for any leaf is found by summing the delta values of all branches in the path from the root to the leaf, and adding in the baseline value. For "morning", "–1" day, the true value is +20 +10, plus the baseline value of $130, for a total of $160.

For the attribute value "+1" of the "day" attribute, the seller assigns different values for the different times of day. For morning of the next day, the delta value is –50, while for afternoon the delta is only –20. For evening of the next day, the delta is –30. There is no night flight on the next day, so no delta value is specified in attribute tree 10 for the "day" attribute for "night". Perhaps the next day is a weekend day with fewer flights.

The total true values are calculated by summing the delta values for all branches leading to the next day leaves. For morning of the next day, the overall true value is +20–50+130 or $100. For afternoon of the next day, the true value is $110, while for evening it is $90.

In FIG. 3B, buyer attribute tree 12 stores true values of a flight from Chicago to New York that are inputted by a buyer. A base value of $300 is stored at the root of buyer attribute tree 12. The first four branches from the root show delta values for different values of the time-of-day attribute. For morning ("AM"), a delta value of –50 indicates that the buyer values morning flights at $250, $50 below the baseline price of $300. Afternoon flights ("PM") have a delta value of 0, while evening has a delta value of –30 and night has a delta value of –100. Thus the buyer values evening flights at $270 and night flights at $200.

For departure one day earlier or one day later, the "day" attribute, the buyer has specified delta values of –20 for all four time-of-day values. For "morning", on either the day before "–1" or next day "+1", the true value is –50–20, plus the baseline value of $300, for a total of $270. For afternoon of the next or prior day, the true value is $280, while for evening it is $250 and night $180.

Figure 4:
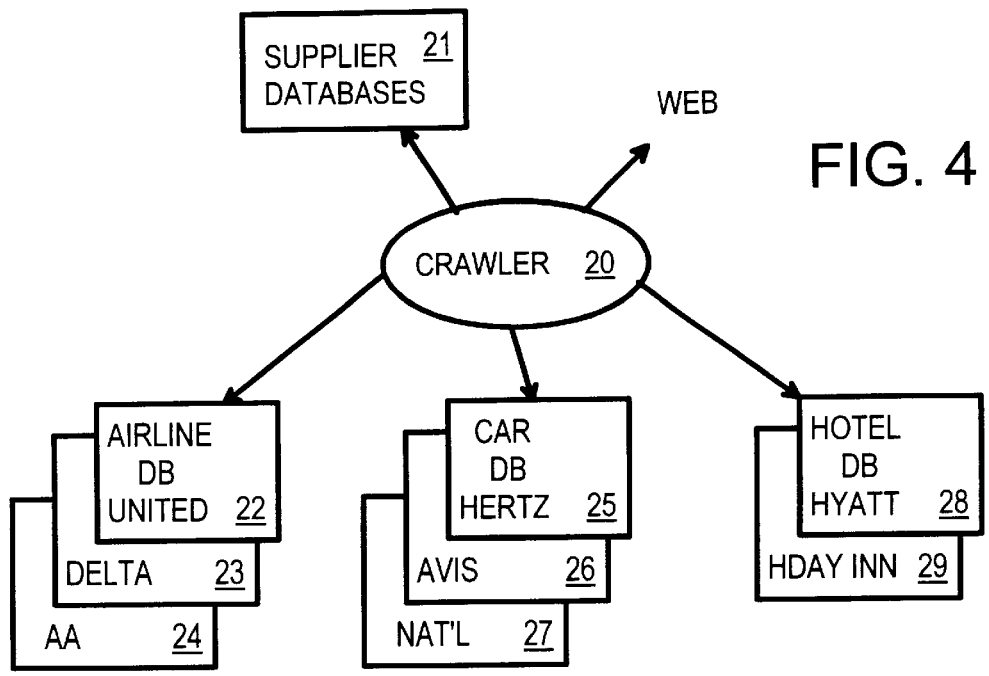
FIG. 4 is a diagram highlighting seller databases.

Seller Databases—FIG. 4

FIG. 4 is a diagram highlighting seller databases. Each seller may sell a wide variety of travel products and services that have many attributes. Crawler 20 can access seller data over the Internet, such as supplier databases 21. Supplier databases 21 are maintained on a supplier's computer network and contain price data for a variety of multi-attribute products.

Crawler 20 reads data from supplier databases 21, and extracts attribute values with delta values from supplier databases 21. The baseline and delta values are written to seller attribute trees in local databases 22–29 for use by the trading system. Local databases 22–29 include airline databases 22–24, rental car databases 25–27, and hotel databases 28–29 for each seller or trading partner.

Ideally, supplier databases 21 contains not retail price data, but true values of the sellers. The true values may be minimum acceptable prices for the sellers for products with the specified attributes. Formulas may be used to adjust or discount price data from supplier databases 21 before being written to local databases 22–29.

Figure 5:
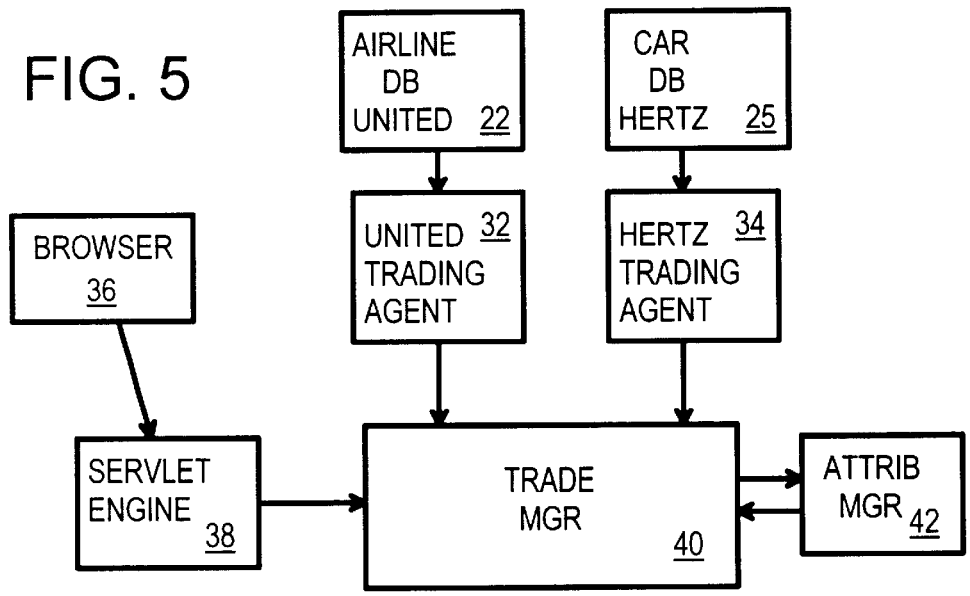
FIG. 5 is a high-level block diagram of a spread-maximizing multi-attribute trading system.

Trading System Block Diagram—FIG. 5

FIG. 5 is a high-level block diagram of a spread-maximizing multi-attribute trading system. Seller airline database 22 and seller car database 25 contain seller attribute trees describing true values from the sellers for multi-attribute products being traded. Airline trading agent 32 is a software module that participates in trades for the airline represented by airline database 22. Likewise, car trading agent 34 is a software module that participates in trades for the rental-car company represented by car database 25. Trading agents 32, 34 receive requests from trading manager 40 to participate in trades and decide to participate in trades based on pre-determined or programmed trading rules or objectives.

The buyer connects to the trading system using browser 36 on a remote computer. Servlet engine 38 receives trade requests from browser 36 and other browsers on the Internet. Servlet engine 38 queries buyers on browser 36 for true values for travel services having multiple attributes, and generates a buyer attribute tree from these true values received from browser 36.

Once a buyer attribute tree has been generated by servlet engine 38, servlet engine 38 sends a trade-initiating request to trading manager 40. Trading manager 40 then sends requests to trading agents 32, 34 (and other trading agents not shown) to participate in the trade.

As the trade is initiated, trading manager 40 receives the buyer attribute tree from servlet engine 38, and seller attribute trees from trading agents 32, 34. Attribute manager 42 then compares the buyer and seller attribute trees to find overlapping attributes and attribute values. A matrix can be set up of all overlapping attribute values from the buyer and seller attribute trees. The net value is calculated for each possible combination of overlapping attribute values by subtracting the seller's true value from the buyer's true value for the combination of attribute values being evaluated.

Once all net values for all possible attribute values have been calculated, trading manager 40 searches the net values for a maximum net value. The attribute values for this maximum net value are the attribute specification of the product that will be sold by the seller(s) and purchased by the buyer. Since the attribute values producing the maximum net value are chosen by trading manager 40, the attributes producing the maximum spread are selected. The value created by trading manager 40 is thus maximized.

Figure 6:
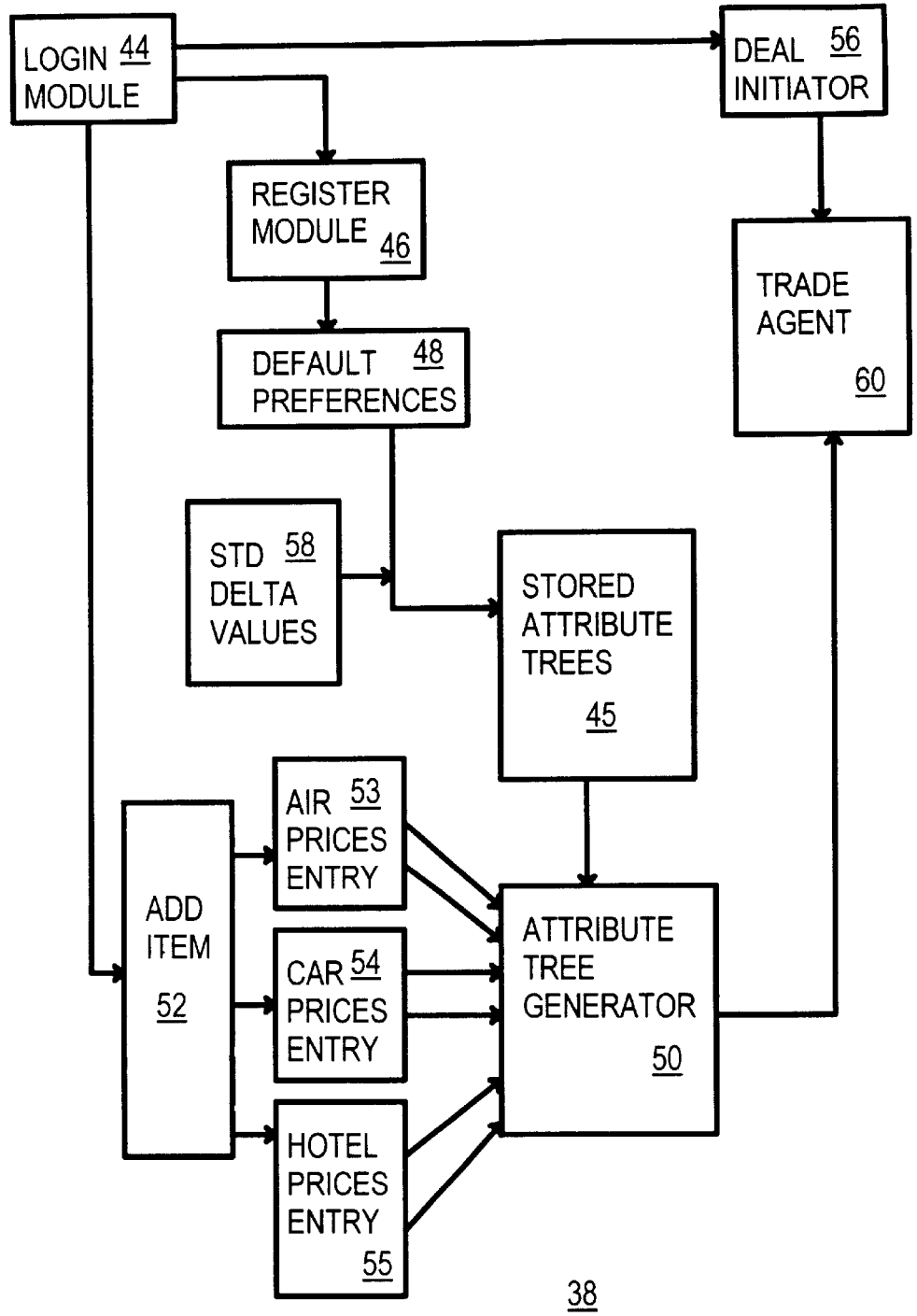
FIG. 6 shows details of the servlet engine that generates the buyer attribute tree from preferences data received from the buyer.

Servlet Engine Generates Attribute Tree for Buyer—FIG. 6

FIG. 6 shows details of the servlet engine that generates the buyer attribute tree from preferences data received from the buyer. Users operate browsers or other client software on remote machines to make connections over the Internet to the travel web site. Once the IP connection and TCP session are established, servlet engine 38 is activated to handle the user's high-level requests.

Users enter servlet engine 38 at login module 44, which asks for the user's name and password. Other general information to the public such as a frequently-asked-questions (FAQ) list, questionnaire, or advertisements may share a web page with the login and password fields. New users click on a link that activates register module 46. Register module 46 displays a registration web page to the new user, which allows the new user to select a user name and password, and a user type (consumer/buyer, airline/seller, etc.). A license agreement or terms of use may also be presented to the new user for review and acceptance before the registration is accepted. The user's name and password are stored in a user database that is queried by login module 44 the next time the user logs on.

Once the user has finished registration with register module 46, default preferences module 48 is activated. The new user is presented with a web page of travel questions, allowing the new user to specify his default preferences. For example, the user may prefer afternoon flights but not morning or night flights. He may prefer certain hotel chains or rental car companies. These preferences are captured by default preferences module 48. A display screen such as the one shown later in FIG. 7 is used to capture the new user's preferences.

Once the new user's preferences are captured by default preferences module 48, the preferences are quantified by standard delta values 58. The new user states his preferences using words such as "prefer", "don't mind", "dislike", and "strongly dislike" using default preferences module 48. These word answers are converted to numeric delta values by standard delta values 58. For example, "prefer" for morning flights can be assigned a delta value of +30, while "dislike" receives a delta value of −40.

Each preference can have different numeric values in different situations. For example, the "strongly dislike" preference can be translated to a delta value of −50 for night flights, but translated to only −30 for afternoon flights. The "strongly dislike" preference may have only a −10 delta value for lower-price products such as the rental car type, but larger delta values for airline tickets. The preferences may also be converted to percentages that are applied to baseline values, such as −10% or +30%. Percentage preferences are more useful for more expensive tickets such as first class or international travel.

Once the preferences from default preferences module 48 are converted into numeric delta values by standard delta values 58, the numeric delta values are stored in stored attribute trees 45. Each delta value is stored in a different leaf or branch of the buyer's attribute tree, depending on the attribute value for that delta value. Since a baseline value has not yet been entered, the attribute tree is only partially specified when first stored in stored attribute trees 45. The tree generated from default preferences module 48 and standard delta values 58 can be used as a default or template tree that is later used to construct other attribute trees for specific travel products.

Once preferences have been entered, and a default attribute tree stored in stored attribute trees 45, the user can add travel products using add module 52. Add module 52 displays a web page to the user allowing him to add airline, hotel, rental car, or other travel services to generate a package or itinerary. The travel products and services that have already been added are displayed to the user on this web page or a linked web page of details. The itinerary is later converted to an attribute tree and sent to the trading manager to initiate a trade.

When the user clicks on an "add air travel" checkbox on the add-item web page displayed by add module 52, air value-entry module 53 is called. Air value-entry module 53 displays a web-page screen similar to the one shown later in FIG. 8, allowing the user to input the departure and arrival airports, dates, and baseline price. Air value-entry module 53 reads delta values from the default attribute tree stored in stored attribute trees 45 to display default delta values in user-input fields on the displayed web page.

The web page displayed by air value-entry module 53 asks the user flexibility questions that quantify the value he places on variations in his travel. For example, the user is asked how much less he is willing to pay for travel one day before or after his specified dates. The numbers entered are the delta values for the attribute "day" for the prior and next days. Likewise, the user is asked to quantify his flexibility in time of day. The user enters how much more or less he is willing to pay for travel in the morning, afternoon, evening, or night. The numbers entered are the delta values for the time-of-day attribute.

The default delta values are initially displayed in the user-entry fields for the flexibility questions. The user can over-ride these default values by typing in a different number. Displaying the default values simplifies data entry by the user, allowing him to change true values for just the attributes he really cares about. Using default values allows many delta values for a wide variety of attributes to be collected in a short time. Having many attributes to vary prices over allows the trading system to find larger spreads, increasing the value created by the value system.

Attribute-tree generator 50 receives the delta values from air value-entry module 53, and stores the delta values in an attribute tree for the current travel package or itinerary. The user is returned to add module 52, allowing the user to then add a rental car or hotel room to the itinerary. When the user selects adding a rental car, add car-values entry module 54 is activated. A web page such as the one shown in FIG. 10 is displayed to the user, allowing the user to specify his baseline price for the rental car. Flexibility questions allow the user to quantify how much more or less he wants to pay for attributes such as car class or early or late drop off. The user can also exclude certain rental car companies.

The user can accept default delta values displayed, or can over-ride these default values and enter new delta values. The delta values are then sent to attribute-tree generator 50, which adds the inputted delta values for rental-car attributes to the attribute tree.

From add module 52, the user can also add a hotel room to the itinerary. When the user selects adding a hotel stay, add hotel-values entry module 55 is activated. A web page such as the one shown in FIG. 9 is displayed to the user, allowing the user to specify his baseline price for the hotel. Flexibility questions allow the user to quantify how much more or less he wants to pay for attributes such as hotel location or dates of stay. The user can also exclude certain hotel chains. Alternately, the user can input how much more or less he is willing to pay for certain hotel chains.

The user can accept default delta values displayed, or can over-ride these default values and enter new delta values. The delta values are then sent to attribute-tree generator 50, which adds the inputted delta values for hotel attributes to the attribute tree.

Once all delta values for all relevant attributes are collected and written to the attribute tree by attribute-tree generator 50, the user can initiate a trade. Deal initiator module 56 is activated by the user pressing a "Find Deal Now" or similar button on a web page Deal initiator 56 activates buyer trade agent 60, which sends a new trade request to the trading manager (FIG. 5). The trading manager sends requests to all relevant seller trading agents, but not to those seller agents for companies or chains that the buyer indicated he wanted to exclude. When seller trading agents respond, the trading manager asks each trading agent to sent its attribute tree so buyer and seller attribute trees can be compared to find the attribute values that have the largest spread. Buyer trade agent 60 responds with the attribute tree generated by attribute-tree generator 50 for the current itinerary.

When the trading agent finds the maximum-spread attribute values, these attribute values are reported back to the buyer and seller. The buyers and sellers can then close the deal.

Default Preferences Entry—FIG. 7

FIG. 7 is a screen shot of a web page for entering default preferences. New users activate default preferences module 48 during the registration process. Default preferences module 48 asks the new user a series of questions about their travel preferences. The user answers these questions by selecting an answer from a drop-down list. The answers are "strongly prefer", "prefer", "don't mind", "dislike", and "strongly dislike". The user selects one of these four answers for each question using the drop-down list box inserted into each question.

Preferences are collected for the "day" attribute, for departing or returning one day before or one day after the requested date. Likewise, the user's preferences are also collected for the time-of-day attribute, for morning, afternoon, evening, or night attribute values. Preferences in the rental car class and the hotel location (proximity to the airport) are also solicited.

Of course, other preferences could also be collected, and a trading system benefits from having preferences collected for more attributes. An actual trading system can have several more screens of preferences questions.

Once the user clicks in the submit button, the user's answers are converted to delta values by translating with standard delta values. For example, the user's responses can be translated as: strongly prefer=+30, prefer=+10, don't mind=+0, dislike=−30, and strongly dislike=−50. The translation to delta values can differ for different attributes, or can be stored as percentages rather than dollar values.

Air Value-Entry Screen—FIG. 8

FIG. 8 shows a web page for a buyer to enter baseline and delta values for air travel. When air value-entry module 53 is called, the web page shown is displayed to the buyer on his browser. The buyer enters the departure and arrival cities or airports, and the dates and times requested. The buyer's baseline price is also entered. This is often the true value at the root of the buyer's attribute tree.

The buyer also answers several flexibility questions. The buyer is asked how much less he wants to pay for prior and next day departure and return. The buyer is also asked how much more or less he wants to pay for morning, afternoon, evening, or night flights. Certain airlines can be excluded by selecting them from a drop-down list. Default values for each flexibility question are initially displayed to the user. The default delta values are read from the default attribute tree that was generated from the user's preferences entered during registration. The user can over-ride these default values by typing in new delta values, or he can leave the default values alone. The user can choose to over-ride only some of the default values. When the user presses the continue button at the bottom of the web page, the baseline and delta values are entered into the buyer's attribute tree at locations for the corresponding attributes.

Hotel Value-Entry Screen—FIG. 9

FIG. 9 shows a web page for a buyer to enter baseline and delta values for a hotel stay. When hotel value-entry module 55 is called, the web page shown is displayed to the buyer on his browser. The buyer enters the hotel location, and the dates requested. The buyer's baseline price per night is also entered.

The buyer also answers several flexibility questions. The buyer is asked how much less he wants to pay for prior and next day check-in or check-out. The buyer is also asked how much more or less he wants to pay for being within 10 miles of the airport. Certain hotel chains can be excluded by selecting them from a drop-down list.

Default values for each flexibility question are initially displayed to the user. The default delta values are read from the default attribute tree that was generated from the user's preferences entered during registration. The user over-rides these default values by typing in new delta values. When the user presses the continue button at the bottom of the web page, the baseline and delta values are entered into the buyer's attribute tree at locations for the corresponding hotel attributes.

Rental-Car Value-Entry Screen—FIG. 10

FIG. 10 shows a web page for a buyer to enter baseline and delta values for a rental car. When rental car value-entry module 54 is called, the web page shown is displayed to the buyer on his browser. The buyer enters the rental car pick-up and drop-off location, dates and times. The rental car class (premium, full-size, economy, subcompact, etc.) is entered. The buyer's baseline price per day is also entered.

The buyer again answers several flexibility questions. The buyer is asked how much less he wants to pay for prior and next day pick-up or drop-off. The buyer is also asked how much more or less he wants to pay for different car classes. Certain rental-car chains can be excluded by selecting them from a drop-down list.

Default values read from the default attribute tree for each flexibility question are initially displayed to the user and can be changed by typing in new delta values. When the user presses the continue button at the bottom of the web page, the baseline and delta values are entered into the buyer's attribute tree at locations for the corresponding rental car attributes.

Spread-Maximizing Deal Shown—FIG. 11

FIG. 11 is a web page displaying attributes for a spread-maximizing deal found by the trading manager. Once the buyer has entered all his baseline and delta values, the buyer attribute tree is formed and sent to the trading manager for comparison with seller attribute trees. The difference between the buyer and seller true values for each valid combination of attribute values is calculated, and the set of attribute values that yields the maximum spread is chosen by the trading manager.

Results web page 62 is then displayed to the buyer, showing the spread-maximizing deal. The attribute values for this spread-maximizing deal are displayed, such as the airline, travel days and times. In this example, the time-of-day attribute has the value "afternoon" for the preferred "day" attribute. The buyer's true value for this combination of attribute values is displayed, which is his baseline plus the sum of delta values for the attribute values selected by the trading manager.

The trading system divides the spread-maximizing net value among the buyer, seller, and trading exchange. In the example shown in FIG. 2, the buyer's true value for afternoon was $300 while the seller's true value was $130, producing a spread of $170, which was the maximum spread. The spread of $170 is divided with the buyer receiving $50, the seller receiving $80, and the exchange receiving $40.

The buyer's deal price is his true value minus his share of the net value, or $300–50 $250. The seller's deal price is $210, which is $80 above the seller's true value. The deal price displayed is the price to be paid by the buyer. The seller receives less than this deal price due to a commission or cut taken by the trading system ($40 in this example).

This deal price, the buyer's true value, and the portion of the net value allocated to the buyer (his savings) are displayed by results web page 62. To accept the deal, the buyer clicks on the Buy button and completes the purchase using a credit card or other payment method.

The buyer can also press the adjust button, and go back to the air value-entry module to adjust his delta values. This may be done when the buyer realizes that the deal offered does not really meet his needs.

FIG. 12 is a web page displaying attributes for several spread-maximizing deals found by the trading manager. The buyer may specify several attribute in a package, such as air travel, hotel, and rental car. Some of the seller agents may provide package discounts. The trading system finds differences between buyer and seller overall true values for the package that includes several trading elements. The overall package that maximizes the spread is chosen for display to the user. Individual prices for trading elements are not shown; only the overall package price.

Several of the top spread maximizing packages can be shown to the user at the same time on results web page 62. For example, the top two packages with the two largest spreads can be shown, allowing the buyer to select one of these. This provides the buyer more flexibility and control over his itinerary. Note that the spread-maximizing deal is not necessarily the lowest-price deal to the buyer, since the buyer may value some attributes more than others. This also has the added advantage that it helps the user in choosing between deals in cases where the user or the system could not appropriately quantify the preferences.

FIG. 13 is a web page displaying the best deal at a higher price found by the trading manager. Sometimes the buyer's true values are lower than the seller's true values for all attribute possibilities. Then no positive spread can be found and no deal made. When no deal is found by the trading manager, the user is displayed the closest deal using a page similar to results web page 62. The user can purchase the closest deal by pressing the buy button, or the user can adjust his true values by pressing the adjust button.

A queue button is also displayed, allowing the buyer to queue the request to the trading manager for a persistent search. The trading manager then periodically retrieves all queued offers and attempts to find attribute combinations that produce a positive spread. When the trading manager finds such a deal, it notifies the buyer by email or by another method.

Figure 14A:
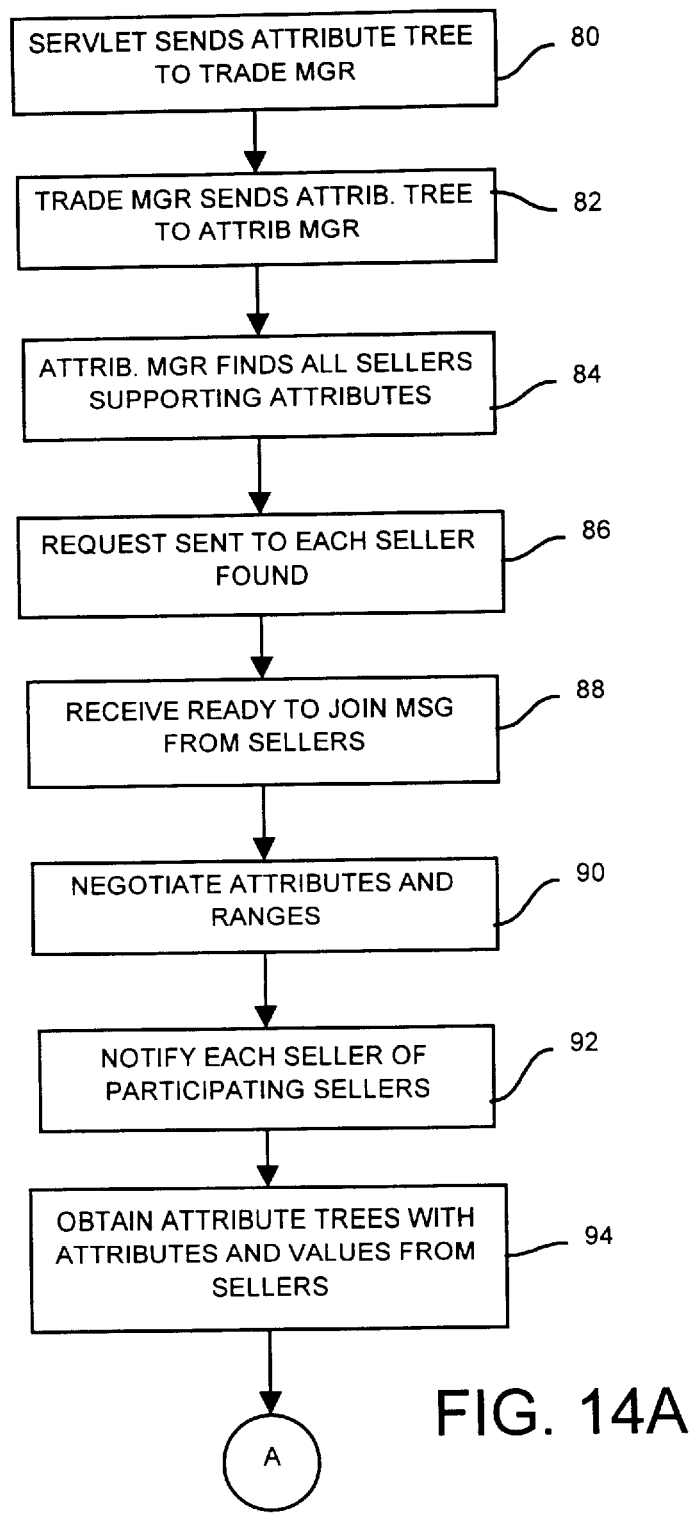
FIGS. 14A, B show a flowchart for a spread-maximizing trade.

Spread-Maximizing Trade—FIGS. 14A,B

FIGS. 14A, B show a flowchart for a spread-maximizing trade. In FIG. 14A, the buyer inputs baseline and delta values for a travel itinerary which are formed into a buyer attribute tree. The buyer initiates a trade and the servlet engine sends the buyer attribute tree to the trade manager, step 80. The trade manager uses the attribute manager to parse the buyer attribute tree to determine attribute values for the buyer, step 82. The attribute manager helps the trade manager find sellers that trade travel products that match the attribute values submitted by the buyer, step 84. A request is sent to each seller identified in step 84 to participate in the trade, step 86. Sellers that wish to participate in the trade reply with a ready-to-join message from their trading agents to the trade manager, step 88.

The attributes and ranges of attribute values are negotiated, step 90. Range negotiations can be of several kinds. For instance, the airline may specify that it cannot specify "time of day" attributes in terms of "morning, afternoon, evening, night" but as "AM and PM". Internally, some translations happen to ensure that the user specified ranges can be translated to the airline specified ranges. Thus the system may go back and forth between the trading partners to ensure that only those that support compatible sets of attributes participate in a trade or part of a trade. It is possible that the consumer says that "meal type" attribute is optional which means that the consumer can trade with an airline that supports this attribute or that does not support this. The system can use heuristics to reduce the number of round trip negotiations or even drop trading partners who do not support a variety of attributes or ranges so as to improve performance. Each of the sellers is notified of which sellers of other service categories are participating in the trade, step 92. This allows for package discounts by members of a travel alliance, such as when a rental-car company offers a discount when a certain airline in the same alliance is used. The allied sellers can communicate among their trading agents to put together a package deal from two or more alliance members.

The seller attribute trees for the travel product being traded are then sent from the seller's trading agents to the trading manager, step 94. These seller attribute trees contain the baseline and delta values for multi-attribute travel products.

Figure 14B:
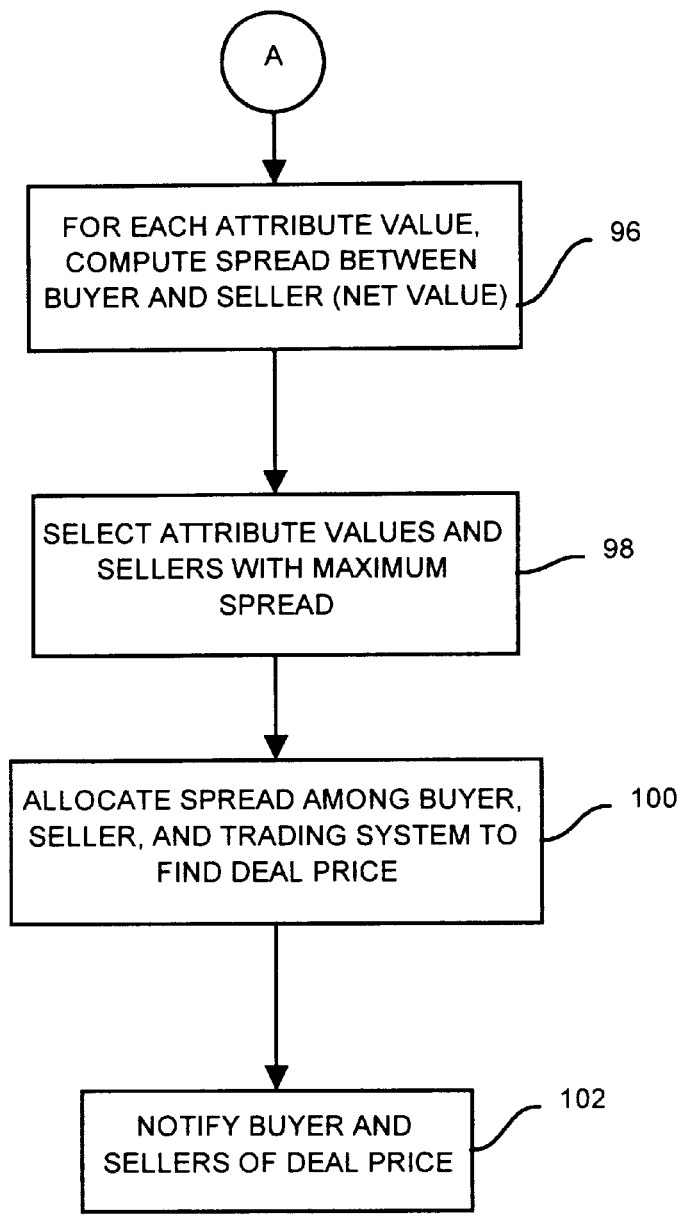

Continuing in FIG. 14B, the trading manager calculates the spread or net value between the buyer's true value and the sellers' true value for each valid combination of attribute values, step 96. The sellers' true value may be a sum of true values from different seller's attribute trees, such as a rental-car true value from a rental-car seller's tree and an air travel true value from an airline's attribute tree. When competing sellers participate in a trade for the same attribute values, the trading system takes the lower of the seller's true values, ignoring the higher true value. Competition encourages sellers to provide lower true values to increase chances of participating in an accepted deal with the buyer.

Once the spreads for all possible attribute value combinations have been computed, the trading manager searches for the largest spread and selects the attribute values that produced this largest spread between buyer and seller true values, step 98. The maximum spread or net value is then divided among the buyer, seller, and trading exchange, step 100. The spread may be divided in a predetermined manner, such as fixed percentages to each party, or can be dynamically adjusted for various sales goals or promotions, such as returning all of the spread to the buyer.

The deal price to the buyer is then calculated by subtracting the buyer's portion of the spread from the buyer's true value for the selected attribute values. The buyer is notified of the deal price, and the seller is notified of the seller's portion of the spread, step 102. Both buyer and sellers are notified of the attribute values for the spread-maximizing deal. The deal may then be closed and payment and other terms finalized.

Advantages of the Invention

Both the buyer and the seller benefit from the spread-maximizing trading system. Attributes tend to be selected that the buyer most highly values and that the seller least values. These spread-maximizing attribute specifications may not be obvious or easily discerned, especially when many, many attributes can be specified in a complex product or multi-trading-element package.

The multi-attribute trading system is ideally suited for travel services since travel products have multiple attributes that affect the price. Having many attributes to vary prices over allows the trading system to find larger spreads, increasing the value created by the value system.

The trading system maximizes value to both buyers and sellers. A neutral trading system is achieved that is not biased toward the buyer or the seller. The trading or deal price is based on a spread between values inputted by buyers and sellers. The trading system maximizes the spread between buyer and seller values by selecting from among multiple attributes of the product traded to find a specification of attributes that maximizes the spread or difference between a buyer-specified value and a seller-specified value. An integrated multi-attribute, spread-maximizing trading system is achieved.

The trading system has a clear advantage over a catalog model in which sellers put up a catalog system with a static set of attributes. Such systems have the disadvantage of "support or buy based upon these attributes, or else get out". The inventors' system has the advantage that it allows trading partners to attach "positive or negative" true values to attributes and their values. Even weighted attribute search systems do not support this facility.

The system also has an advantage that it helps the seller in identifying the most appropriate buyer to whom he should sell the product to and that it helps the buyer in identifying the most appropriate seller he should buy from.

It also has the advantage that it allows the buyer to specify the product he wishes to buy in terms of the attributes and their values and how much he cares about them and attach a positive or negative utility (price) value to each of them rather than a "yes or no" value.

It also has the advantage that it allows both the seller, over a period of time, to appropriately price the product based upon attributes and how they are valued by different customers. It helps the sellers to identify and sell to their most profitable customer niche. It helps sellers refine their product offerings, pricing, and help them identify their affiliates. Similarly, it allows customers, over a period of time, to attach true values to attribute and their values, based upon how they have closed a deal in the past. Sellers understand customer preferences at a detailed level and customers understand sellers preferences at a detailed level.

The system also intelligently puts together a "basket" of multiple products. For instance, it can create a vacation planner it can create a package of air ticket, car rental, and hotel accommodation that results in the greatest transactional value to the buyer and each of the sellers and service providers in the "basket".

The system has also the advantage that it allows total confidentiality between trading partners at the same time allowing trading partners to dynamically get into alliance with trading partners in a different service category. The trading partners can also selectively reveal their identity to those who are willing to reveal their identity.

Alternate Embodiments

Several other embodiments are contemplated by the inventors. Some embodiments may not allow the buyer to make adjustments after the deal is submitted to the trading system, and some may use binding offers from the buyer. Many different web pages can be shown to the user at different points in time. Sellers may use a different interface to the trading system. For example, sellers may provide large tables of products that are fully specified rather than provide delta values. The crawler or other software at the trading exchange can then parse these tables to extract delta values and base prices for different attribute values.

Several different itineraries or travel packages can be stored by the servlet engine. The user can be asked to select which of the saved itineraries to use when adding items or initiating a trade. Demand aggregation from several buyers can be performed even when buyers have different attribute values and delta values. The true values from all buyers are summed and the sum of true values from sellers are subtracted to get the aggregate net value.

The attributes may depend on other attributes or be linked together to restrict possible attribute values or combinations. For example, the prior-day attribute value for air travel, rental-car, and hotel are linked together and must be considered together. It is not possible to consider the next-day attribute value for air travel but the prior-day attribute for the rental car. Attribute trees can be stored or arranged in a variety of ways. Multiple attribute trees can be linked together, or parts of larger trees can be selected for comparison. The true values can be stored as baseline values and delta values in a tree-like or a relational structure, or as absolute prices in a flat or table structure. Linked lists can also be used.

Many implementations of the functions described can be used. Object-oriented or distributed-object programming methods can be employed and a wide variety of programming languages can be used. Software can partition functions in many different ways. Additional functions can be added. The trading exchange may physically exist on many web servers in geographically remote areas, yet be connected together by networks.

In another embodiment of the invention, the user may specify fuzzy values of attributes. For instance, the user may say "I want to fly from the Bay Area to NewYork". The system will translate "Bay Area" to one of several airports in the SF Bay Area (SJC, SFO, OAK) and similarly New York is translated to (JFK, La Guardia, and Newark). This may introduce new attributes, and the system will allow the user to attach deltas and preferences to each of these. For instance, the consumer can say SJC (+50), SFO (−30), OAK (−100). Also, if the user is flying out of SFO, he may require a rental car to take him from his home to the airport. Thus depending upon values of certain attributes, other attributes or attribute values may be introduced.

Conditional Preferences and Deltas may be specified. The system may also allow the customer to say "If I am flying out of SJC, I do not mind having a 1 stop flight but if I am flying out of SFO, I prefer a direct flight".

In another embodiment, the seller may be a consolidator, who intelligently consolidates one or more actual seller data to provide price and support for multiple attributes based upon buyer preferences. Similarly, a buyer may be a consolidated buyer, specifying the requirements on behalf of one or more buyers.

In another embodiment, the system may provide hints to the user about attributes and attribute value choices and default true values for these choices based upon typical choices made by consumers or winning consumers or the same consumer in previous trades.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computerized spread-maximizing trading system for trading multi-attribute products comprising:
    a plurality of seller trading agents, for accessing seller databases containing seller true values for multi-attribute products distinguished by a variety of attributes with attribute values, each seller trading agent representing a seller;
    a buyer interface, for receiving buyer true values from a buyer, the buyer interface generating buyer true values for the multi-attribute products distinguished by the variety of attributes with attribute values;
    a trading manager, coupled to the buyer interface and to the plurality of seller trading agents, for receiving the buyer true values and the seller true values for the multi-attribute products; and
    an attribute manager, coupled to the trading manager, for generating a plurality of spreads for the multi-attribute products, each spread in the plurality of spreads being a difference of a buyer true value and a seller true value for a specific combination of attribute values;
    wherein the trading manager finds a spread-maximizing product in the multi-attribute products by finding a maximum spread in the plurality of spreads generated by the attribute manager, the maximum spread having a largest difference between the buyer true value and the seller true value, the maximum spread occurring for a spread-maximizing combination of the attribute values that specifies the spread-maximizing product;
    wherein the trading manager selects the spread-maximizing product for sale by the seller to the buyer, the trading manager notifying the buyer of the spread-maximizing combination of the attribute values that specifies the spread-maximizing product,
    whereby the spread-maximizing product is selected by finding the spread-maximizing combination of the attribute values having a maximum difference between the buyer true values and the seller true values.

2. The computerized spread-maximizing trading system of claim 1 wherein the trading manager further comprises:
    a spread distributor, receiving the maximum spread, for dividing the maximum spread among the buyer and a seller, the spread distributor assigning a buyer portion of the maximum spread to the buyer and a seller portion of the maximum spread to the seller;
    wherein the trading manager reports a deal price to the buyer interface, the deal price being the buyer true value for the spread-maximizing combination of the attribute values less the buyer portion of the maximum spread,
    wherein the buyer pays the deal price which is less than the buyer true value by the buyer portion of the maximum spread.

3. The computerized spread-maximizing trading system of claim 2 wherein the seller receives a seller payment that is larger than the seller true value for the spread-maximizing product, the seller payment being larger by the seller portion.

4. The computerized spread-maximizing trading system of claim 3 wherein the maximum spread includes an exchange portion, the exchange portion being the maximum spread less the buyer portion and the seller portion;
    wherein the exchange portion is paid to the spread-maximizing trading system,
    whereby the maximum spread is divided among the buyer, seller, and the spread-maximizing trading system.

5. The computerized spread-maximizing trading system of claim 1 wherein the trading manager also selects other larger-spread products, the other larger-spread products having larger differences between the buyer true values and the seller true values than other products in the multi-attribute products;
    wherein the trading manager also notifies the buyer of larger-spread combinations of the attribute values that specify the other larger-spread products,
    whereby the buyer is notified of several larger-spread products as well as the spread-maximizing product.

6. The computerized spread-maximizing trading system of claim 5 wherein the buyer interface displays the several larger-spread products and the spread-maximizing product to the buyer;
    wherein the buyer interface receives a selection from the buyer, the selection identifying a chosen product from the several larger-spread products and the spread-maximizing product;
    wherein the buyer interface notifies the trading manager of the chosen product;
    wherein the trading manager notifies the seller of the chosen product,
    whereby the buyer selects from the several larger-spread products and the spread-maximizing product.

7. The computerized spread-maximizing trading system of claim 6 wherein the buyer interface receives a baseline value and delta values from the buyer, the delta values for adding to the baseline value to generate the buyer true values for the multi-attribute products.

8. The computerized spread-maximizing trading system of claim 7 wherein the buyer interface comprises:
    a preferences module, activated during a registration process, for receiving default preferences from the buyer; and a value-entry module that receives the baseline value and delta values from the buyer, the value-entry module first displaying default delta values to the buyer, the default delta values generated from the default preferences;

wherein the buyer is able to over-ride the default delta value by inputting new delta values, the new delta values being used to generate the buyer true values sent to the trading manager, whereby the buyer can over-ride the default preferences.

9. The computerized spread-maximizing trading system of claim 8 wherein the buyer interface further comprises:

a standard delta values module containing translations from word preferences to default delta values;

wherein the preferences module receives word preferences that are not numeric from the buyer, the word preferences qualitatively indicating preferences by the buyer;

wherein the standard delta values module translates the word preferences from the preferences module to the default delta values sent to the value-entry module, whereby the word preferences are translated to numeric values.

10. The computerized spread-maximizing trading system of claim 9 wherein the buyer interface further comprises:

a default store, coupled to receive the default delta value from the standard delta values module, for storing the default delta values.

11. The computerized spread-maximizing trading system of claim 8 wherein the buyer interface further comprises:

a browser interface, coupled to a remote client over a network, for receiving buyer preferences used to generate the buyer true values from the buyer and for displaying the spread-maximizing product to the buyer.

12. The computerized spread-maximizing trading system of claim 8 wherein the buyer interface further comprises:

an attribute-tree generator, receiving the baseline value and the delta values from the value-entry module, for storing the baseline value and the delta values in a buyer attribute tree;

wherein the buyer interface sends the buyer attribute tree to the trading manager as the buyer true values, whereby the buyer true values are stored in the buyer attribute tree.

13. The computerized spread-maximizing trading system of claim 12 wherein the buyer attribute tree includes a root that stores the baseline value and branches that store the delta values for corresponding attribute values;

wherein a buyer true value for the spread-maximizing product is generated by summing the baseline value at the root with the delta values along branches having attribute values in the spread-maximizing combination of the attribute values.

14. The computerized spread-maximizing trading system of claim 12 wherein the plurality of seller trading agents each generate seller attribute trees that store the seller true values;

wherein the plurality of seller trading agents send seller attribute trees to the trading manager, whereby the attribute manager compares the seller attribute trees to the buyer attribute tree when generating the plurality of spreads.

15. The computerized spread-maximizing trading system of claim 14 wherein the spread-maximizing product does not have a lowest seller true value nor a lowest buyer true value, whereby the spread-maximizing product is not a lowest-price product.

16. The computerized spread-maximizing trading system of claim 15 wherein the multi-attribute products are travel services including air travel, hotel stays, and rental cars.

17. The computerized spread-maximizing trading system of claim 16 wherein the value-entry module further comprises:

an air value-entry module for inputting baseline value and delta values for air travel including delta values for time-of-day of departure;

a rental-car value-entry module for inputting baseline value and delta values for a rental car, including delta values for car class;

a hotel value-entry module for inputting baseline value and delta values for a hotel stay.

18. The computerized spread-maximizing trading system of claim 17 wherein the attributes include a time-of-day attribute indicating a time of day when air travel is to occur.

19. The computerized spread-maximizing trading system of claim 18 wherein the seller true values are not revealed to the buyer, and the buyer true values are not revealed to the seller, whereby true values are hidden.

20. A computer-implemented method for trading multi-attribute products comprising:

receiving on a computer a plurality of buyer true values from a buyer, the plurality of buyer true values for specifying values to the buyers for variations in the multi-attribute product, the variations being specified by attributes having attribute values;

sending the plurality of buyer true values to a trading manager, the trading manager reading the plurality of buyer true values to determine current attributes of the multi-attribute product the buyer is specifying for trading;

determining sellers that sell multi-attribute products that include the current attributes;

receiving a plurality of seller true values from each seller trading agent that represents a seller of the multi-attribute products, the seller true values for specifying values to the seller for variations in the multi-attribute product, the variations being specified by the attributes having the attribute values;

for each valid combination of the attribute values, calculating a spread between the buyer true value and the seller true value for the multi-attribute product as specified by the valid combination of the attribute values;

finding a maximum spread from the spreads calculated;

determining spread-maximizing attribute values for the valid combination that produced the maximum spread between the buyer true value and the seller true value;

identifying a spread-maximizing seller that sent the seller true value that produced the maximum spread; and trading the multi-attribute product as specified by the spread-maximizing attribute values with the spread-maximizing seller, whereby spread-maximizing attribute values for the multi-attribute product are determined.

21. The computer-implemented method of claim 20 further comprising:

forming a buyer attribute tree from the plurality of buyer true values from the buyer;

wherein receiving a plurality of buyer true values from the buyer comprises receiving the buyer attribute tree that contains the plurality of buyer true values from the buyer, whereby the buyer true values are stored in the buyer attribute tree.

22. The computer-implemented method of claim 21 wherein receiving the plurality of buyer true values from the buyer includes receiving a baseline price and receiving delta values, the delta values adjusting the baseline price to reflect changes in the multi-attribute product specified by different attribute values, whereby the baseline price and the delta values are received from the buyer.

23. The computer-implemented method of claim 22 wherein the delta values are positive when the buyer more highly values an attribute value, but negative when the buyer values less the attribute value.

24. The computer-implemented method of claim 23 wherein the baseline price is stored at a root of the buyer attribute tree, while branches of the buyer attribute tree store the delta value;

wherein the buyer true values are generated by summing the baseline price with the delta values along branches in a path to a valid combination of the attribute values, wherein the branches are for different attribute values.

25. The computer-implemented method of claim 24 wherein dependent attributes are dependent on other attributes, wherein attribute values for dependent attributes are restricted by attribute values for the other attributes.

26. The computer-implemented method of claim 25 wherein the multi-attribute product includes a plurality of trading elements for different travel services;

wherein dependent attributes of a trading element depend on attribute values of other attributes of a different trading element, whereby attribute dependencies exist across trading elements.

27. The computer-implemented method of claim 26 wherein some attribute values are expanded to a plurality of attribute values.

28. The computer-implemented method of claim 21 wherein receiving the plurality of seller true values further comprises receiving a seller attribute tree from the seller trading agent, whereby the seller true values are stored in seller attribute trees.

29. The computer-implemented method of claim 28 wherein the trading manager calculates the spread by comparing the buyer attribute tree to the seller attribute tree, whereby attribute trees are compared to determine the spreads.

30. The computer-implemented method of claim 29 wherein the buyer true values are not disclosed to the sellers, and the seller true values are not disclosed to the buyer, whereby true values are confidential.

31. The computer-implemented method of claim 21 further comprising:

sending requests to seller trading agents representing sellers that the trading manager determines to sell multi-attribute products that include the current attributes;

receiving ready to join messages from sellers that sell multi-attribute products with the current attributes, whereby participating sellers are determined by sending requests based on the current attributes.

32. The computer-implemented method of claim 31 further comprising:

negotiating ranges of the current attributes with the seller trading agents to determine attribute ranges of the attribute values, whereby attribute ranges are negotiated.

33. The computer-implemented method of claim 32 further comprising:

notifying sellers in a trading alliance of other sellers in the trading alliance that are participating in the trade, whereby trading alliance sellers are notified of other alliance sellers participating in the trade.

34. The computer-implemented method of claim 33 further comprising:

adjusting seller true values when two or more sellers in the trading alliance are participating in a trade, whereby discounts from trading alliance sellers are performed by adjusting the seller true values.

35. The computer-implemented method of claim 21 further comprising:

partitioning the maximum spread among the buyer, spread-maximizing seller, and a trading exchange to determine a price paid by the buyer and a price received by the seller, whereby the maximum spread is partitioned.

36. The computer-implemented method of claim 35 wherein the spread is negative when the buyer true value is less than the seller true value, while the spread is positive when the buyer true value is greater than the seller true value;

wherein when no positive spread exists for the valid combination of attribute values, allowing the buyer to queue a request, the trading manager later requesting the seller true values and re-computing the spreads with new seller true values, whereby requests are queued for later trading when spreads are negative.

37. A computer-program product comprising:

a computer-usable medium having computer-executable program code means embodied therein for trading multi-attribute products, the computer-readable program code means in the computer-program product comprising:

network connection means for transmitting and receiving packets from a remote client operated by a buyer;

buyer interface means, coupled to the network connection means, for receiving buyer values from the buyer, the buyer values for specifying buyer preferences of attributes in a multi-attribute product;

trading manager means, coupled to the buyer interface means, for identifying a spread-maximizing set of attribute values for the multi-attribute product, the trading manager means facilitating a trade between a seller and the buyer of the multi-attribute product having the spread-maximizing set of attribute values; and seller agent means, coupled to the trading manager means, for representing in trades, the seller agent means sending seller values for the multi-attribute product to the trading manager means, the seller values specifying seller values for multi-attribute product having various attribute values;

wherein the trading manager means includes attribute compare means that receives a seller value and a buyer value for each valid set of the attribute values, the attribute compare means generating a spread for each valid set by generating a difference between the buyer value and the seller value for each valid set;

wherein the trading manager selects the spread-maximizing set from the valid sets of the attribute values by finding a maximum spread in a plurality of spreads generated for a plurality of the valid sets of the attribute values, the maximum spread having a largest difference between the buyer value and the seller value, whereby the spread-maximizing set of the attribute values is selected to specify the multi-attribute product for trading between the buyer and the seller.

38. The computer-program product of claim 37 wherein the computer-readable program code means further comprises:

buyer-tree generating means, coupled to the buyer interface means, for generating a buyer attribute tree, the buyer attribute tree quantifying the buyer values as a baseline price and delta values that increase or decrease the baseline price when the multi-attribute product is modified by attribute values;

wherein the buyer-attribute tree is sent to the trading manager means, whereby buyer preferences for attributes are quantified and stored in the buyer attribute tree.

39. The computer-program product of claim 37 wherein the buyer interface means further comprises:

standard delta value means, coupled to receive buyer preferences from the buyer, for translating the buyer preferences into numeric values, the numeric values for generating the buyer values sent to the trading manager means, whereby buyer preferences are translated to numeric values.

40. The computer-program product of claim 37 wherein the trading manager means further comprises:

spread partitioning means, coupled to receive the maximum spread, for assigning a buyer portion of the maximum spread to the buyer, the buyer paying the buyer value less the buyer portion, and for assigning a seller portion of the maximum spread to the seller, the seller receiving the seller value and the seller portion, whereby the maximum spread is shared with the buyer and seller.

41. The computer-program product of claim 37 wherein the multi-attribute product is a travel-services package that includes air travel, a hotel stay, and a rental car, wherein attribute values specify flight details, hotel location, and rental-car class.

* * * * *